(No Model.)

D. B. HISER.
CLUTCH.

No. 449,415. Patented Mar. 31, 1891.

WITNESSES:
H. M. Plaisted.
Warren Hull.

INVENTOR
Daniel B. Hiser,
BY H. A. Toulmin,
HIS ATTORNEY.

UNITED STATES PATENT OFFICE.

DANIEL B. HISER, OF SPRINGFIELD, OHIO, ASSIGNOR TO THE THOMAS MANUFACTURING COMPANY, OF SAME PLACE.

CLUTCH.

SPECIFICATION forming part of Letters Patent No. 449,415, dated March 31, 1891.

Application filed December 15, 1890. Serial No. 374,716. (No model.)

*To all whom it may concern:*

Be it known that I, DANIEL B. HISER, a citizen of the United States, residing at Springfield, in the county of Clark and State of Ohio, have invented certain new and useful Improvements in Clutches, of which the following is a specification, reference being had therein to the accompanying drawings.

This invention relates to certain new and useful improvements in clutches, and is especially adapted to be used with lawn-mowers, but may be applied to other machines, such as hay-rakes, grain-drills, &c., and the peculiarities of which will be hereinafter more fully described and set forth.

Figure 1:
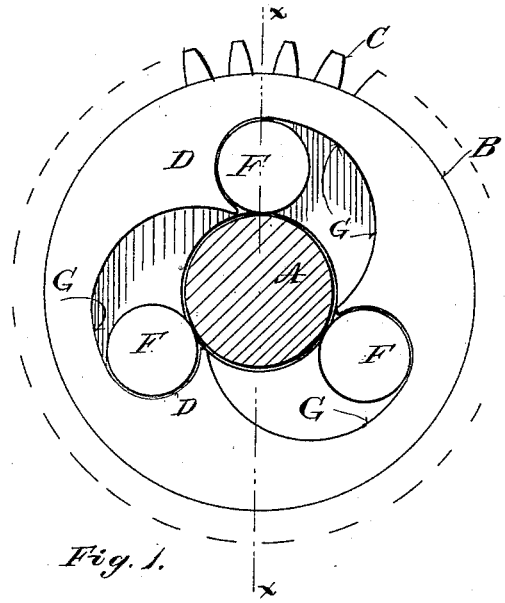
Figure 2:
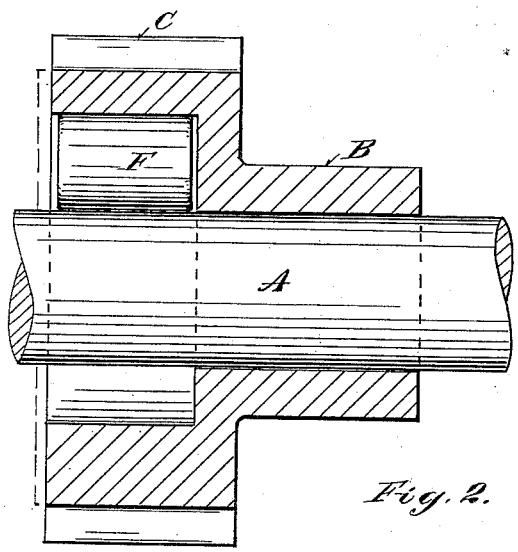
Figure 3:
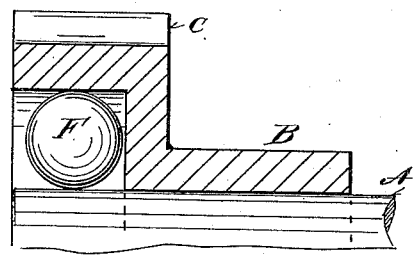
Figure 4:
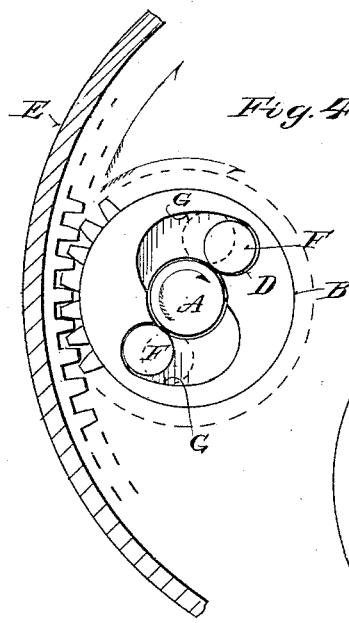

In the accompanying drawings, forming a part of this specification, and on which like reference letters and numerals indicate corresponding parts, Figure 1 represents an end view of the preferred form of my device and a section of the shaft on which it is mounted; Fig. 2, a longitudinal section on the line $x$ $x$ of Fig. 1, showing a cylinder as the movable gripping-piece; Fig. 3, a section similar to Fig. 2, showing a ball as the movable gripping-piece; Fig. 4, a modification of the clutch having a double gripping action on the shaft and a portion of the driving-wheel thereof, and Fig. 5 an end view of a clutch having but one gripping-piece.

Figure 5:
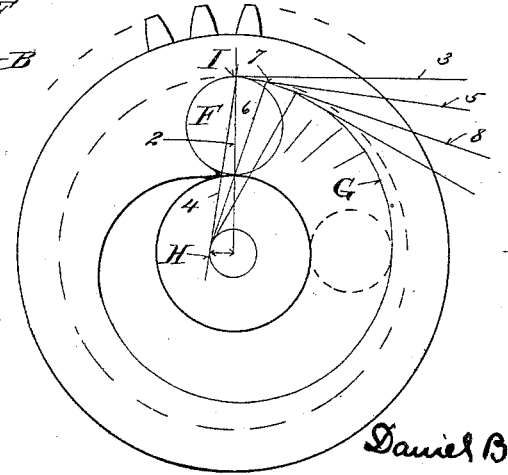

The letter A represents a shaft, preferably the driven member, on which is loosely mounted a sleeve B, preferably provided with gear-teeth C, adapted to be engaged by the driving-gear E, Fig. 4, or otherwise, whereby motion is transmitted from the driving member to the driven shaft through a gripping member, which forms the intermediate connection between the sleeve B and said shaft A. The shaft A will be the reel-shaft of a lawn-mower and the sleeve with its teeth the driven pinion when the device is used in a lawn-mower. In this case the wheel E represents the ground-wheel of the mower. This gripping-piece F may be in the form of a cylinder, as shown in Fig. 2, or a ball, as shown in Fig. 3, or other figure of revolution, and is preferably mounted to bear directly upon the shaft A at one portion of its surface and upon the sleeve B at another portion of its surface, said sleeve B having operating-surfaces G formed thereon, which gradually approach the shaft, as seen in Figs. 1, 4, and 5, according to a principle hereinafter stated, whereby a frictional engagement between the surfaces G and the shaft A is secured. Fig. 1 shows three of said surfaces G and Fig. 4 two of said surfaces, each surface acting on the corresponding gripping-piece F, which is gripped between the shaft and the surfaces G by the rotation of the sleeve B, thus causing the shaft and sleeve to become one piece when actuated in one direction, and thus rotate the shaft.

In Fig. 5 I have illustrated a method whereby the surface G is formed. It will be seen that this surface G approaches the shaft gradually, and in order that the gripping-piece F may not slip in its frictional contact with said surface and with the shaft the rate of approach of said surface G must be according to a fixed law now to be explained. The radial line 2, Fig. 5, passes through the points of contact of the piece F with the shaft and surface G, respectively. The perpendicular to said line is at 3. If I draw a circle at H the radius of which is approximately one-seventh the distance from the center of the shaft to the point I, and then draw the line 4 tangent to the said circle and to the point I, a perpendicular 5 to this latter line at I will give me the inclination of a portion of said surface G. Another line 6, similar to 4, will intersect the curve G at the point 7, for instance, and a line 8 at that point perpendicular to the line 6 will give us another portion of said curve G. By dividing up the surface into a number of said inclines according to this rule we will produce a curve G, which gradually approaches the shaft A, as before described. This inclination is based upon the fact that two surfaces of metal in contact will not slide on each other, even though they be oiled, if the said inclination of the pressure to a perpendicular to the surface is four degrees or less. This is based on scientific experiment, and I need not therefore go further into the matter.

The action of the device is illustrated in Fig. 4, in which the direction of the arrows shows the direction of rotation of the driving-wheel E, the sleeve B, and the shaft A under the clutching action of the gripping-pieces F, the said pieces having a tendency, as indicated by the dotted lines, to roll farther into the opening between the gradually-approaching surfaces G and the shaft A. A reverse movement of the driving-wheel E will break such clutch action and cause the sleeve B to loosely revolve on the shaft A without the rotation of the latter, the gripping-piece F in each opening remaining at the largest width of said opening and without any gripping action on either the shaft or the sleeve during the said backward action of the wheel E. It will be observed that the sleeve B acts directly on the shaft A through the gripping piece or pieces F without any other intermediate connection therewith. If desired, it may be mounted on any portion of the shaft without any special adaptation of the latter to receive the clutch. While the sleeve B is shown open at the acting-surface G, it may be closed by a plate, as indicated in Fig. 2, if so desired, or otherwise formed to contain the said gripping-piece F.

It is evident that while I have described the shaft A as the driven member it may become the driving member and cause the sleeve B and its connections to rotate therewith through the frictional contact of the gripping-pieces F upon the surface G and shaft A when rotated in one direction and break the engagement on the reverse rotation of the said shaft.

While I have illustrated one, two, and three, gripping-pieces F, and in the shape of cylinders and balls, a larger number may be used and of various shapes, if so desired. It will be seen also that when the piece F is reduced in size by wearing it will still act effectively on the sleeve and shaft when it reaches its gripping position and slides its lessened diameter between the surface G and shaft A, as indicated by the dotted lines in Fig. 5.

Referring again to Fig. 4, it will be seen that when the sleeve B is in the position illustrated the upper gripping-piece is supported by a shoulder D, while the lower gripping-piece is retained in approximately its correct position, which allows of the insertion of the clutch within the machine without causing the gripping-pieces to slip from their adjusted position. This facilitates the ready application of the clutch to the machine in the setting up of the same; also, the inner portion of the pocket D adjacent to the shaft is shown in Figs. 1, 4, and 5 to extend forward and under the corresponding gripping-piece, whereby the said inner portions tend to lift and support the gripping-pieces out of contact with the shaft under the reverse movement of the sleeve. This assists in breaking the grip of the pieces F and promotes the life of the same by preventing the wear against the shaft while they are carried by the shaft in their respective pockets during a reverse non-actuating movement of the loosely-mounted revolving sleeve.

Having thus fully described my invention, what I claim as new, and desire to secure by Letters Patent, is—

1. In a clutch, the combination of a shaft, a sleeve loosely mounted thereon, and interposed gripping-pieces, said sleeve being provided with recesses, each having an outer wall converging forward toward the shaft at one end of said recess and curving inward and forward in the same direction as the said outer wall to form a pocket at the other end and adapted to project forward under the gripping-piece, substantially as shown, to break the binding contact of the said gripping-piece with said shaft and support it out of contact with the shaft under the reverse movement of the operative member.

2. In a clutch, the combination of a shaft, a sleeve, and an interposed binding-piece, the said sleeve having the herein-described bearing-surface G gradually approaching the center, a tangent line 5 to the surface G, making an angle of approximately four degrees with the line 3, perpendicular to the radial line 2 at the point of contact of said gripping-piece with the surface G, and so on successively, whereby the binding action of said piece is secured.

In testimony whereof I affix my signature in presence of two witnesses.

DANIEL B. HISER.

Witnesses:
 THOS. P. FELTER,
 GEO. A. BEARD.